United States Patent [19]

Uchida

[11] Patent Number: 5,832,102
[45] Date of Patent: Nov. 3, 1998

[54] APPARATUS FOR EXTRACTING FINGERPRINT FEATURES

[75] Inventor: Kaoru Uchida, Tokyo, Japan

[73] Assignee: NEC Corporation, Tokyo, Japan

[21] Appl. No.: 745,200

[22] Filed: Nov. 8, 1996

[30] Foreign Application Priority Data

Nov. 8, 1995 [JP] Japan .................................. 7-289460

[51] Int. Cl.⁶ .................................................. G06K 9/00
[52] U.S. Cl. .......................... 382/124; 382/115; 382/168
[58] Field of Search .................................... 382/168, 124, 382/125, 126, 170, 171, 127, 115, 216, 287, 289, 290; 356/71

[56] References Cited

U.S. PATENT DOCUMENTS

| | | | |
|---|---|---|---|
| 4,394,683 | 7/1983 | Liptay-Wagner et al. | 348/128 |
| 5,359,672 | 10/1994 | Okumura et al. | 382/168 |

FOREIGN PATENT DOCUMENTS

| | | | |
|---|---|---|---|
| 1-271883 | 10/1989 | Japan | G06F 15/62 |
| 1-271884 | 10/1989 | Japan | G06F 15/62 |
| 02035577 | 2/1990 | Japan | G06F 15/62 |
| 3-108075 | 5/1991 | Japan | G06F 15/62 |
| 7-9033 | 4/1995 | Japan | G06F 7/00 |

OTHER PUBLICATIONS

Teruo Akiyama et al., "Automated Entry System For Printed Documents", Recognition, vol. 23, No. 11, 1990, pp. 1141–1154.

M. Takeda et al., "Finger Image Identification Method for Personal Vertification", 10th Int. conf. on Pattern Recognition, Jun. 1990, pp. 761–766.

R.O. Duda et al., "Use of the Hough Transformation to Detect Lines and Curves in Pictures", Communications of the ACM Association For Computer Machinery, vol. 15, No. 1, Jan. 1972, pp. 11–15.

Primary Examiner—David K. Moore
Assistant Examiner—Wenpeng Chen
Attorney, Agent, or Firm—Foley & Lardner

[57] ABSTRACT

In order to extract position and direction of the first joint line of a fingerprint for stable pattern positioning in fingerprint comparison, an apparatus for extracting fingerprint features comprises a vertical strip divider (11) for dividing digitized data of a fingerprint into data of a plurality of strips with straight lines parallel to a y direction; a projection calculator (12) for obtaining histograms, each of said histograms calculated by accumulating pixel values of each of said plurality of strips in an x direction perpendicular to said y direction; a valley candidate calculator (13) for detecting candidate valleys from said histograms, one of said histograms having a locally minimum value at each of said candidate valleys; and a valley information integrator (116) for calculating a position of a joint line of said fingerprint from positional information of said candidate valleys detected by said valley candidate calculator (13).

8 Claims, 4 Drawing Sheets

APPARATUS FOR EXTRACTING FINGERPRINT FEATURES

BACKGROUND OF THE INVENTION

The present invention relates to an apparatus for detecting fingerprint features used for pattern positioning in fingerprint comparison.

As a prior art for finger print comparison, there is an apparatus disclosed in a Japanese patent application entitled "Picture Pattern Processor" and laid open as a Provisional Publication No. 108075/'91, wherein, picture patterns of a fingerprint under search and a filed fingerprint, both including patterns of the first and the second finger joints, are compared with each other after pattern positioning.

Referring to FIG. 8, a histogram $J1(x)$ of density distribution is obtained in the prior art for each fingerprint $l1(x, y)$, for the pattern positioning, by accumulating pixel values of the finger print pattern in a y direction perpendicular to the finger axis. By shifting the mutual position of the histograms of the two fingerprints along an x direction parallel to the finger axis, one may determine a match by finding the position giving the least-square sum of differences between the two histograms.

As other prior arts for pattern positioning, methods of detecting cores of fingerprints are disclosed in Japanese patent applications laid open as Provisional Publications No. 271883/'89 and 271884/'89, both entitled "Method of fingerprint core detection". In the former application, a core of a fingerprint to be used for pattern positioning is determined as a probable center of ridge line curvature obtained from direction of each ridge line segment of the fingerprint, and it is calculated, in the latter application, from tops of convex lines (points having maximum curvature) detected on the ridge lines.

Still another prior art for determining direction of fingertip axis of a fingerprint is disclosed in a Japanese patent application No. 79033/'95, entitled "Apparatus for Detecting Fingertip Axis".

In consideration of the fact that the angular difference between ridge line directions at a peripheral point and a radial direction of the point from the core of the fingerprint has a correlation with the angular difference between the radial direction of the point and the direction of the fingertip axis, a distribution pattern dictionary of scalar products of unit vectors of ridge lines and their radial directions is prepared in the prior art from fingerprints of which fingertip axis are known. By calculating the scalar products between a fingerprint under search, the direction of the fingertip axis is obtained referring to the distribution pattern dictionary.

However, there are some problems in the prior arts above described.

In the prior art disclosed in the Japanese patent application entitled "Picture Pattern Processor", the pixel values are accumulated only in the direction perpendicular to the finger axis on an assumption that the fingerprint patterns are obtained from fingers well positioned in the same direction, by means such as a finger guide provided on a platen for fingerprint imprinting. Therefore, reliable pattern positioning can not be performed when fingerprints are imprinted obliquely.

For instance, the above assumption can not be expected when a comparison is performed between fingerprint data of two fingers read out by a scanner from fingerprint cards of ten fingers, because the imprinting direction of the fingers are not standardized for each of the ten fingers nor among fingerprint cards.

FIG. 4 shows an example of an input picture of such fingerprint data.

When the finger axis is oblique as in FIG. 4, pattern positioning by shifting a histogram of pixel density accumulated in a fixed direction (direction perpendicular to the finger axis, x axis in this case) can not bring a reliable result.

Furthermore, there are cases where a part of a fingerprint is lacking, as when the face of the finger is not imprinted sufficiently flat on a surface, for example. In these cases, when the histogram is calculated by accumulating all pixel values for a finger width perpendicular to the finger axis as in this prior art, a small value of the histogram may appear in the missing part, other than the finger joint, where the histogram must originally have a large value. So, methods resting on the premise that a small value of the histogram represents the finger joint can not guarantee the correct pattern positioning.

Compared to the above prior art, methods disclosed in the patent applications beforehand described entitled "Method of fingerprint core detection", or that entitled "Apparatus for Detecting Fingertip Axis" are said to be able to bring reliable and accurate results realizing high accuracy verifications, in many cases, of fingerprints having a variety of positions and directions imprinted with a variety of conditions and qualities.

However, even with these methods, it is some times difficult to obtain a sufficiently accurate and reliable pattern positioning when the picture quality in the central part of a fingerprint defining the ridge line curvatures is not sufficiently good.

SUMMARY OF THE INVENTION

Therefore, a primary object of the present invention is to provide an apparatus for extracting fingerprint features for enabling more reliable pattern positioning, which can be applied even when sufficient information can not be obtained by these prior methods above described because of picture quality degradation in the central part of a fingerprint.

In particular, the object of this invention is to provide an apparatus for extracting the position and the direction of a line indicating the first finger joint (hereafter the joint line) included in most pictures imprinted on the fingerprint cards of ten fingers, together with the confidence of the position and the direction extracted, for indicating reliability of the extraction.

In order to achieve the object, an apparatus for extracting fingerprint features of the invention comprises:

a vertical strip divider for dividing digitized data of a fingerprint into data of a plurality of strips with straight lines parallel to a y direction;

a projection calculator for obtaining histograms, each of said histograms calculated by accumulating pixel values of each of said plurality of strips in an x direction perpendicular to said y direction;

a valley candidate calculator for detecting candidate valleys from said histograms, one of said histograms having a locally minimum value at each of said candidate valleys;

a valley confidence calculator for calculating valley confidence for each of said candidate valleys;

a strip confidence calculator for calculating strip confidence for each of said plurality of strips; and a valley information integrator for calculating a position of a joint line of said fingerprint and confidence of said joint line from positional information of said candidate valleys detected by said valley candidate calculator, said valley confidence calculated by said valley confidence calculator and said strip confidence calculated by said strip confidence calculator.

DESCRIPTION OF THE DRAWINGS

The foregoing, further objects, features, and advantages of this invention will become apparent from a consideration of the following description, the appended claims, and the accompanying drawings following in which the same numerals indicate the same or the corresponding parts.

DETAILED DESCRIPTION OF THE PREFERRED EMBODIMENTS

Figure 1:
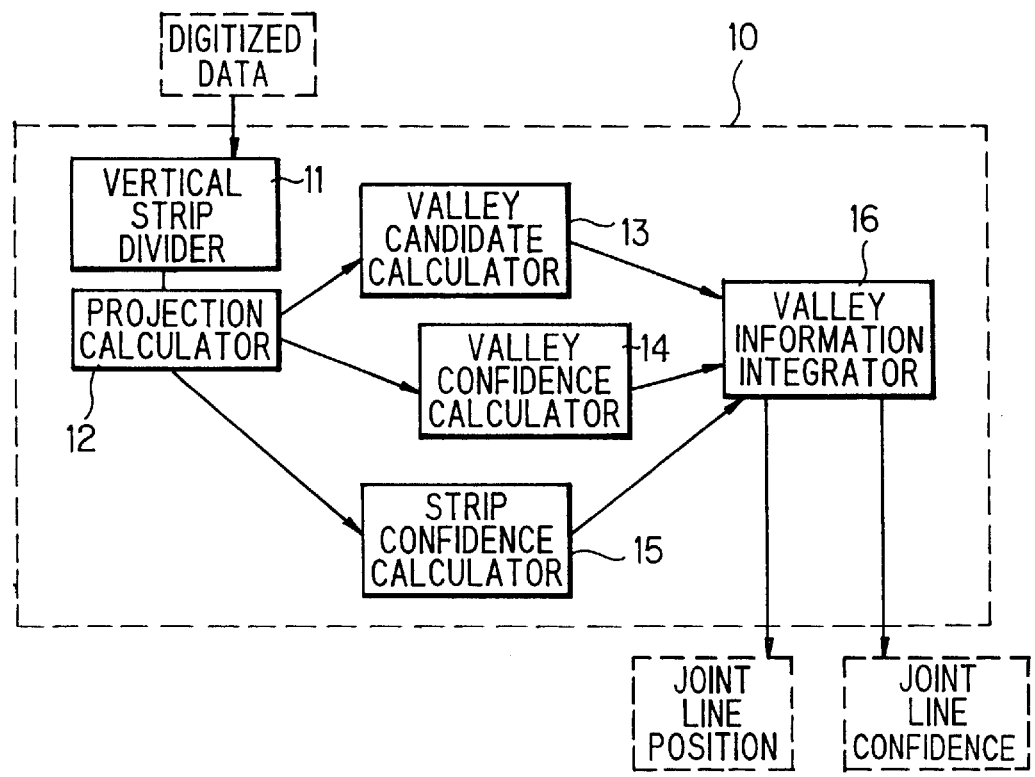
FIG. 1 is a block diagram illustrating a basic composition of an embodiment of the present invention.

Now, referring to the drawings, embodiments of the present invention are described.

FIG. 1 is a block diagram illustrating a basic composition of an embodiment of the present invention, wherein digitized data of a fingerprint extracted from a fingerprint card, for example, are supplied. In general, fingerprints are imprinted on the fingerprint cards roughly vertically with some inclination.

Figure 4:
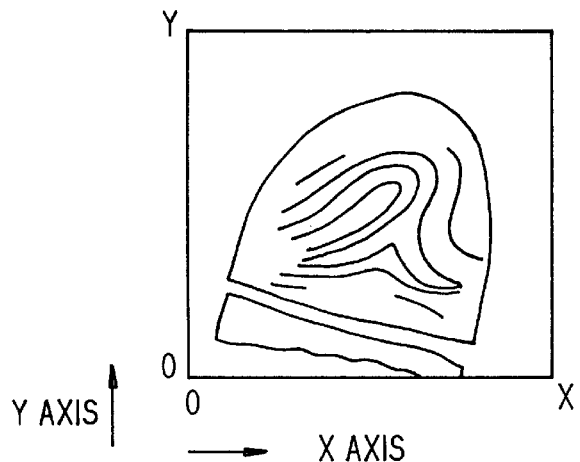
FIG. 4 illustrates an example of the digitized data to be supplied to the apparatus of the embodiment.

FIG. 4 illustrates an example of the digitized data to be supplied to the apparatus of the embodiment, expressed on an area of X×Y pixels, of which x and y axes represents the horizontal and vertical direction of the fingerprint card. The digitized data of a fingerprint is represented by a function $f(x, y)$ expressing darkness of pixels at coordinates $(x, y)$ ($0 \leq x < X$, $0 \leq y < Y$) having large values at black lines imprinted and small values at white background spaces.

Considering that a joint line should be a white straight region nearly horizontal and having a certain width, the joint line to be detected is defined, in the embodiment, as a white region composed of a nearly horizontal array of white sub-regions where pixels have values locally small compared to pixels in upper and lower regions. For detecting each of the white sub-regions, the area of X×Y pixels, hereafter called the processing area, is divided into a plurality of vertical strips and the horizontal projection is calculated for each of the strips.

For this purpose, a vertical strip divider 11 and a projection calculator 12 are provided in the embodiment of FIG. 1.

When the digitized data of a fingerprint such as above described are supplied to the apparatus, the processing area of the digitized data is divided into adjacent vertical rectangular strips (hereafter simply called the strips), with a plurality of vertical parallel lines by means of the vertical strip divider 11.

In the projection calculator 12, each of the strips is first smoothed in the vertical (y) direction by low pass filtering in order to eliminate influences of horizontal ridge lines in detecting the white sub-region in the projected histogram, making use of the fact that the darkness variation of a ridge line is narrower than that of a joint line. For the low pass filtering to obtain the smoothed data $g(x, y)$ from the digitized data $f(x, y)$, a following equation can be applied, for example.

$$g(x,y) + \frac{1}{2L+1} \sum_{l=-L}^{L}$$

L being window size for the filtering.

After the smoothing, the horizontal projection, namely a histogram $h_m(y)$ is calculated for each (m-th) of the strips as follows.

$$h_m(y) = \sum_{i=0}^{W-1} g(mW+i,y) \; (0 \leq m < N_h)$$

where $W = X/N_h$ is the width of a strip, $N_h$ being a number of the strips.

Thus, $N_h$ histograms are obtained from the digitized data of a fingerprint.

Figure 5:
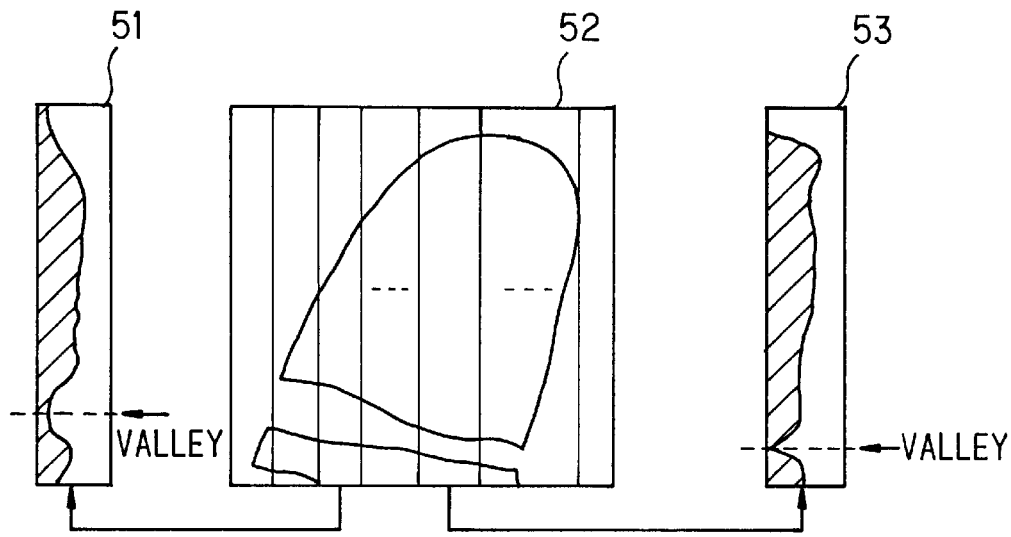
FIG. 5 illustrates examples of the digitized data 52 divided into strips and their histograms 51 and 53.

In FIG. 5, examples of the digitized data 52 divided into strips and their histograms 51 and 53 are illustrated.

On general, picture quality of fingerprints is not good enough and their joint lines are somewhat inclined. So, the value of the projected histogram does not become zero at the joint line, but becomes small locally compared to neighboring areas. Making use of the fact, a valley candidate calculator 13 of FIG. 1 extracts candidates of the white sub-region to be detected, namely the valleys of the histograms.

Figure 2:
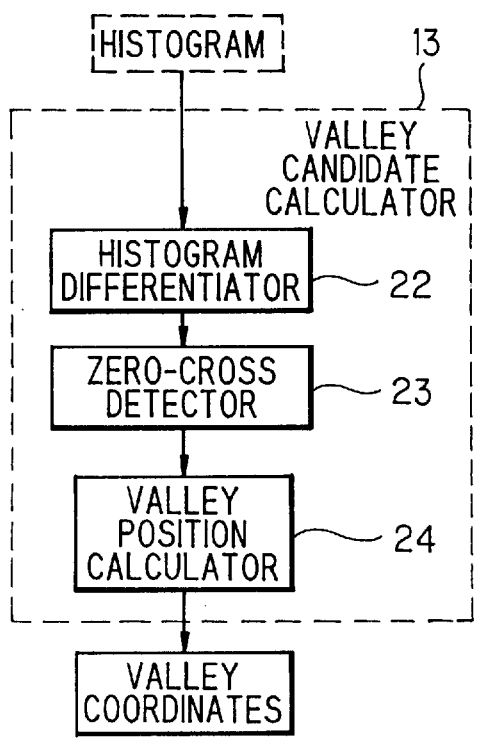
FIG. 2 is a block diagram illustrating the valley candidate calculator 13 of FIG. 1.

FIG. 2 is a block diagram illustrating the valley candidate calculator 13 comprising a histogram differentiator 22, a zero-cross detector 23 and a valley position calculator 24.

Scanning a histogram $h_m(y)$ delivered from the projection calculator 12 from up to down (increasing y coordinates), the histogram differentiator 22 calculates differential $d/dy\, h_m(y)$ representing inclination of the histogram $h_m(y)$.

The zero-cross detector 23 extracts valley candidates of the histogram $h_m(y)$ according to values of the differential $d/dy\, h_m(y)$ as follows;

1. Where $d/dy\, h_m(y)$ becomes less than $-\epsilon$, a valley candidate begins, $\epsilon$ being a small positive constant.
2. Where $d/dy\, h_m(y)$ becomes positive from negative, crossing zero, there lies the bottom of the valley candidate.
3. Where $d/dy\, h_m(y)$ becomes less than $\epsilon$ after once exceeding $\epsilon$, the valley candidate ends.

Then, defining depth and width of the valley candidate as the average height of the histogram $h_m(y)$ at the beginning and the ending points compared to that at the bottom of the valley candidate and the difference of y coordinates between the beginning and the ending points respectively, the valley position calculator 24 selects valleys $P_i$ having the depth and the width both more than their threshold values, from the valley candidates thus extracted, and outputs their coordinates $(x_i, y_i)$, $x_i$ being x coordinates of the center of the concerning strip and $y_i$ being y coordinates of the bottom of the valley $P_i$. number of the valleys for each strip may be zero, one or more.

With a simple method as above described, a reliable extraction of valleys $P_i$ can be performed here, since the strips are smoothed in the pre-processing.

In the valleys $P_i$ obtained as above described, there are included many false valleys other than valleys indicating the true joint line, that is, white local sub-regions caused of various factors such as wrinkles, ridge lines, injuries of the finger or blurs, blots or stains accompanying its imprinting. For selecting true valleys among them, a valley confidence calculator 14 is provided for calculating so called the joint line indexes for each of the valleys $P_i$ thus obtained, determined from three factors, position, depth and depth-width ratio by referring to the relation between the index value and the three factors beforehand prepared statistically from numbers of known samples.

For example, positions of joint lines of known samples are input manually and an index function having variables of the position, the depth and the depth-width ratio of the valleys concerning to the joint lines is calculated from their distributions obtained by extracting valleys from the samples in the same way, so as to have the highest value at the peak of the distributions. Referring to the index function, valley confidence $C_i$ is determined for each of the valleys $P_i$. The valley confidence $C_i$ has a larger positive value when the valley is the more probable to be the valley corresponding to a joint line.

A strip confidence calculator 15 of FIG. 1 calculates strip confidence $D_m$ for each m-th strip from an average of its histogram $h_m(y)$ in y direction according to a following equation.

$$D_m = \frac{1}{Y} \sum_{y=0}^{Y-1} h_m(y)$$

From information thus calculated, a valley information integrator 16 of FIG. 1 calculates positional information of the joint line and joint line confidence representing its confidence.

Figure 3:
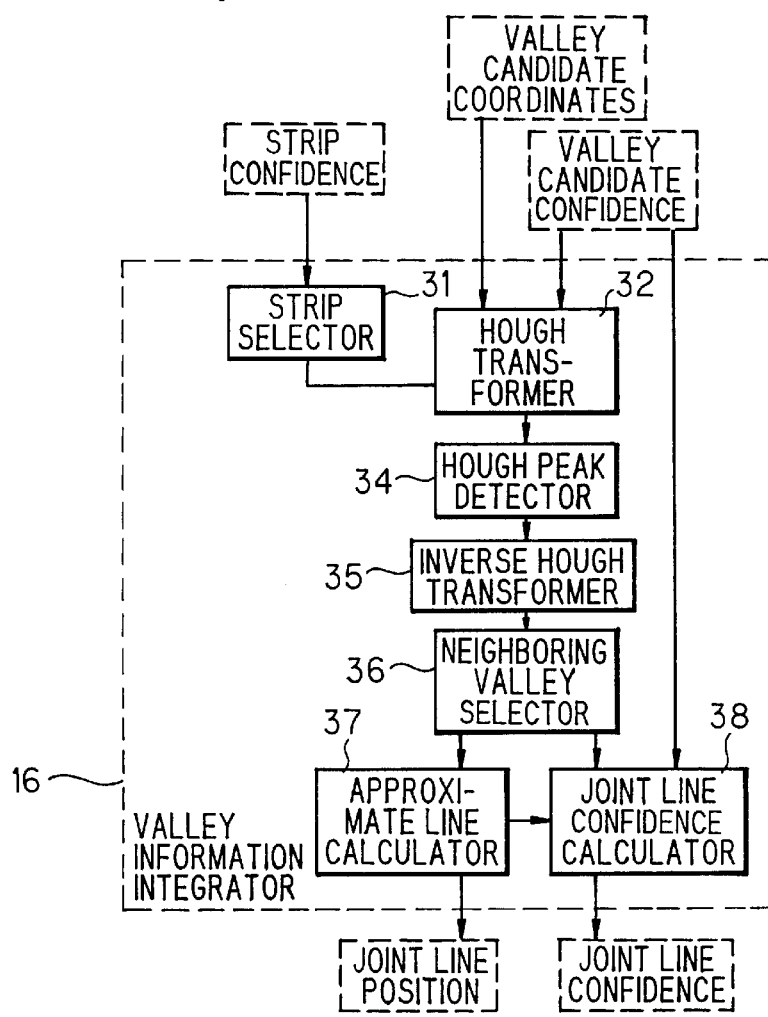
FIG. 3 is a block diagram illustrating the valley information integrator 16 of FIG. 1.

FIG. 3 is a block diagram illustrating the valley information integrator 16, comprised a strip selector 31, a Hough transformer 32, a Hough peak detector 34, an inverse Hough transformer 35, a neighboring valley selector 36, an approximate line calculator 37 and a joint line confidence calculator 38.

The strip selector 31 selects strips having strip confidence $D_m$ larger than a threshold value referring to the strip confidence $D_m$ delivered from the strip confidence calculator 15. The reason for selecting strips is that the reliability of valleys $P_i$ obtained from strips having insufficient darkness, such as strips corresponding background regions situated at both sides of the processing area out of the imprinted region or those corresponding to fringe areas situated at both sides of the imprinted region, is considered to be low. As for the threshold value, an average darkness of the processing area can be applied, for example.

Coordinates $(x_i, y_i)$ and valley confidence $C_i$ of each of the valleys $P_i$ detected on the strips thus selected by the strip selector 31 are supplied to the Hough transformer 32.

In the Hough transformer 32, valleys ranged straight are searched among the valleys $P_i$ including the false valleys by a Hough transformation for detecting a candidate joint line where the true valleys should be ranged straight. As for the Hough transformation, a curved line determined by a following mapping equation is drawn for each of the valleys $P_i$ in a u–v Hough space.

$$\frac{v}{V} = x_i \cos\left(\pi \frac{u}{U}\right) + y_i \sin\left(\pi \frac{u}{U}\right)$$

Then, an image function H(u, v) in the u–v Hough space is calculated by increasing pixel values at coordinates (u, v) ($0 \leq u < U$, $0 \leq v < V$) every time when each curved line corresponding to each of the valleys $P_i$ passes on the coordinates (u, v). The increment is performed here in the embodiment with values proportional to the valley confidence $C_i$ for reflecting confidence of each of the valleys $P_i$, instead of a constant value, one for example, increased in ordinary Hough transformations.

Thus, a point (or points) having an intense pixel value appears in the image function H(u, v) corresponding to the true valleys to be ranged along a straight line, the pixel value intensity of the point representing convergence strength of the straight line weighted by the valley confidence $C_i$.

The Hough peak detector 34 detects a peak point $Q_m = (u_m, v_m)$ (among the points) having a maximum pixel value scanning all of the coordinates (u, v) of the image function H(u, v) in the u–v Hough space.

The inverse Hough transformer 35 calculates a candidate joint line $y = A_h x + B_h$ by an inverse Hough transformation of the peak point $Q_m$ according to following equations.

$$A_h = -\frac{\cos(\pi u_m/U)}{\sin(\pi u_m/U)},$$

$$B_h = \frac{v_m/V}{\sin(\pi u_m/U)}$$

The neighboring valley selector 36 selects valleys in a fixed distance from the candidate joint line $y = A_h x + B_h$ calculated by the inverse Hough transformer 35 as the true valleys consisting in the joint line, by selecting the valleys $P_i$ of the strips selected by the strip selector 31 having coordinates $(x_i, y_i)$ satisfying a following condition, δ being a small positive threshold value.

$$A_h x_i + B_h - \delta < y_i < A_h x_i + B_h + \delta$$

Finally, the approximate line calculator 37 calculates an approximate line $y = Ax + B$ to be determined as the joint line by a least-square approximation from the true valleys above selected as follows.

$$A = \frac{S_{xy} - \overline{xy}}{S_{x2} - \overline{x}^2},$$

$$B = \overline{y} - A\overline{x}$$

wherein $S_{xy} = \Sigma x_i y_i/n$, $S_{x2} = \Sigma x_i^2/n$, $\overline{x} = \Sigma x_i/n$, $\overline{y} = \Sigma y_i/n$, the summation Σ being performed for each of the selected n of the valleys $P_i$.

In the Hough transformation, valleys to be mapped at a point $Q_m$ in the u–v Hough space are those ranged straight within rounding errors among the valleys $P_i$ scattered in the x–y space. However, the joint line is not always strictly straight, and is somewhat curved in many cases, and has a certain width. That means the real joint line may also include valleys not ranged straight. This is the reason for re-selecting valleys near (±ε) the candidate joint line in the neighboring valley selector 36 and obtaining the approximate line to be determined as the joint line by the least-square approximation at the approximate line calculator 37.

Returning to FIG. 3, the joint line confidence calculator 38 calculates a joint line confidence C of the joint line determined by the approximate line calculator 37 from an average value of valley confidence $C_i$ of valleys $P_i$ selected by the neighboring valley selector 36 for obtaining the joint line in the approximate line calculator 37.

Thus, when digitized data of a fingerprint are supplied, coefficients A and B for defining the joint line thereof can be obtained with the apparatus of FIG. 1 of the embodiment, together with joint line confidence C of the joint line obtained. When the digitized data of a fingerprint contains no joint line, the value of the joint line confidence C should be low, near zero, indicating that the obtained joint line could not be applied for the pattern positioning.

Heretofore, the present invention is described along with the embodiments of FIG. 1. However, it is apparent that a various application can be considered in the scope of the invention.

For example, there is comprised the valley confidence calculator 14 in the embodiment heretofore described, but a Hough transformation in the Hough transformer 32 can be performed without the valley confidence calculator 14 by increasing pixel values in the u–v Hough space regarding the value of valley confidence $C_i$ for each of the valleys $P_i$ as the same, one for example. Furthermore, the neighboring valley selector 36 and the approximate line calculator 37 of FIG. 3 can be also omitted by regarding the candidate joint line calculated by the inverse Hough transformer 35 as the joint line to be detected.

Figure 6:
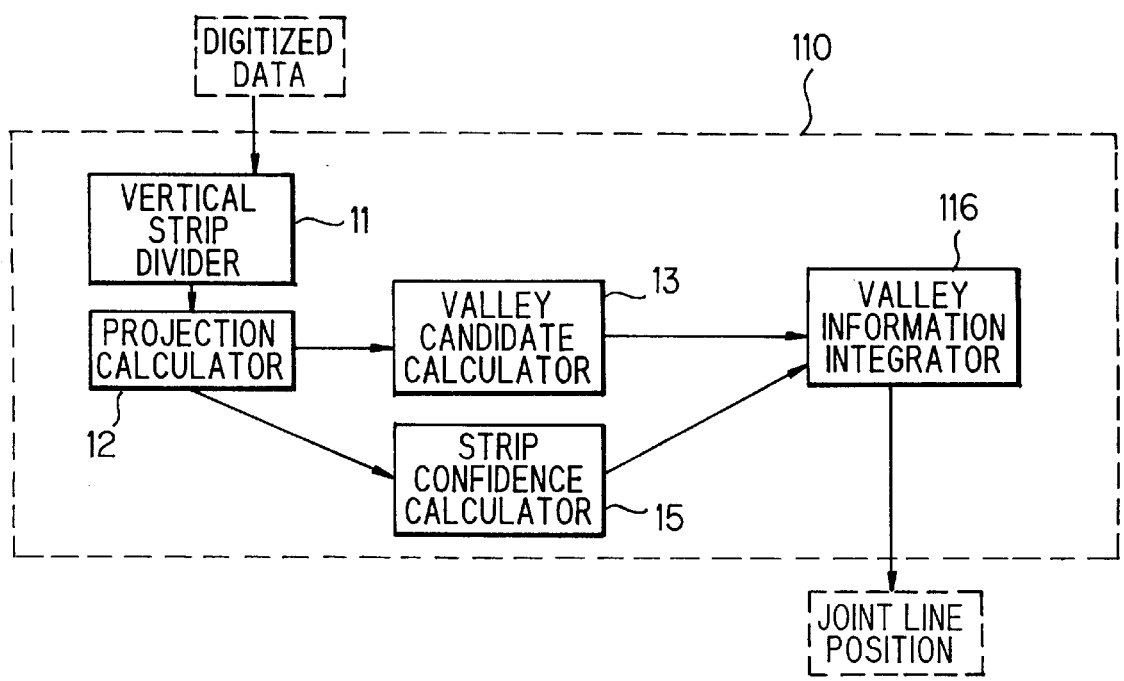
FIG. 6 is a block diagram illustrating another embodiment of the present invention.

FIG. 6 is a block diagram illustrating another embodiment of the present invention without valley confidence calculator, comprising a vertical strip divider 11, a projection calculator 12, a valley candidate calculator 13, a strip confidence calculator 15 and a valley information integrator 116.

The vertical strip divider 11, the projection calculator 12, the valley candidate calculator 13 and the strip confidence calculator 15 function in the same way in the embodiment of FIG. 1, and so duplicated descriptions are omitted.

Figure 7:
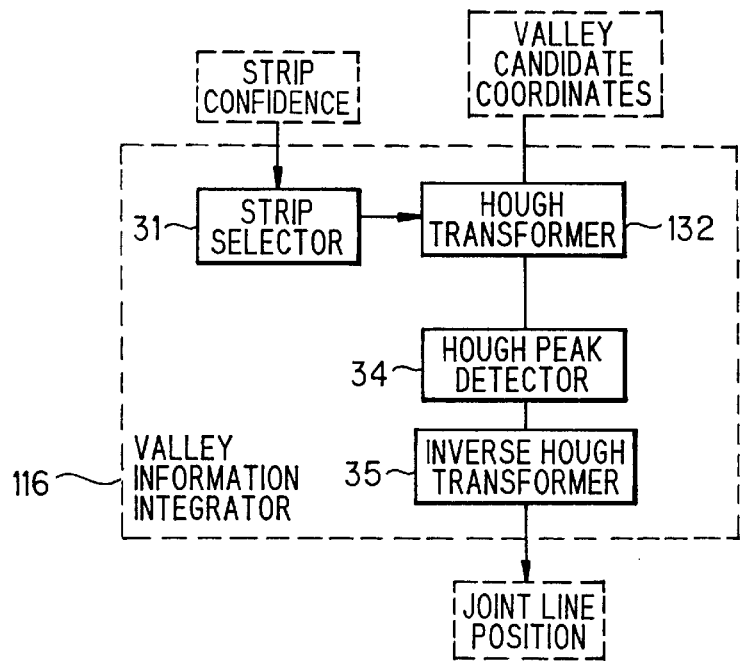
FIG. 7 is a block diagram illustrating configuration of the valley information integrator 116 of FIG. 6.
Figure 8:
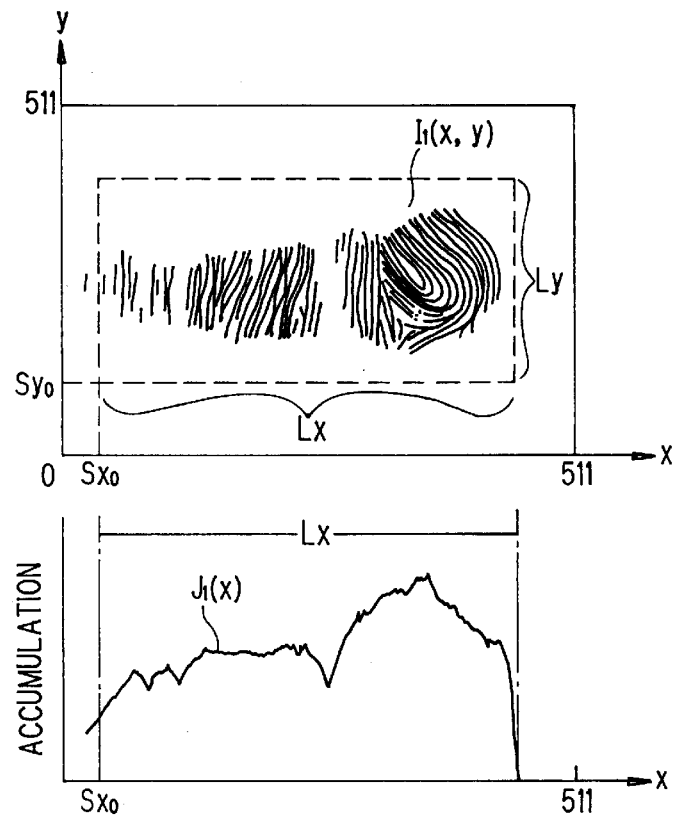
FIG. 8 shows a fingerprint and its histogram for illustrating a prior art.

Configuration of the valley information integrator 116 of FIG. 6 is illustrated in FIG. 7, from where, inter alia, the approximate line calculator 37 and the joint line confidence calculator 38 are omitted compared to the valley information integrator 16 of FIG. 3.

From information obtained by the valley candidate calculator 13 and the strip confidence calculator 15, the valley information integrator 116 of FIG. 6 calculates positional information of the joint line.

The strip selector 31 selects strips having strip confidence $D_m$ larger than a threshold value.

Coordinates $(x_i, y_i)$ of each of the valleys $P_i$ detected on the strips selected by the strip selector 31 are supplied to a Hough transformer 132.

In the Hough transformer 132, valleys ranged straight are searched among the valleys $P_i$ including the false valleys, by a Hough transformation for detecting a candidate joint line where the true valleys should be ranged straight. As for the Hough transformation, a curved line determined by a following mapping equation is drawn for each of the valleys $P_i$ in a u–v Hough space.

$$\frac{v}{V} = x_i \cos\left(\pi \frac{u}{U}\right) + y_i \sin\left(\pi \frac{u}{U}\right)$$

Then, an image function H(u, v) in the u–v Hough space is calculated by increasing pixel values at coordinates (u, v) ($0 \leq u \leq U$, $0 \leq v \leq V$) every time when each curved line corresponding to each of the valleys $P_i$ passes on the coordinates (u, v). The increment is performed here in the embodiment with a constant value, one for example, in the same way as in ordinary Hough transformations.

Thus, a point (or points) having an intense pixel value appears in the image function H(u, v) corresponding to the true valleys to be ranged along a straight line, the pixel value intensity of the point representing convergence strength of the straight line.

The Hough peak detector 34 detects a peak point $Q_m = (u_m, v_m)$ (among the points) having a maximum pixel value scanning all of the coordinates (u, v) of the image function H(u, v) in the u–v Hough space.

The inverse Hough transformer 35 calculates the joint line y=Ax+B to be detected by an inverse Hough transformation of the peak point $Q_m$ according to following equations.

$$A = -\frac{\cos(\pi u_m/U)}{\sin(\pi u_m/U)},$$

$$B = \frac{v_m/V}{\sin(\pi u_m/U)}$$

Thus, when digitized data of a fingerprint are supplied, coefficients A and B for defining the joint line thereof can be obtained with the apparatus of FIG. 6 of the embodiment.

What is claimed is:

1. An apparatus for extracting fingerprint features comprising:

a vertical strip divider for dividing digitized data of a fingerprint into data of a plurality of strips with straight lines parallel to a y direction;

a projection calculator for obtaining histograms, each of said histograms calculated by accumulating pixel values of each of said plurality of strips in an x direction perpendicular to said y direction;

a valley candidate calculator for detecting candidate valleys from said histograms, one of said histograms having a locally minimum value at each of said candidate valleys;

a strip confidence calculator for calculating a confidence value associated with each of said plurality of strips; and a valley information integrator for calculating a position of a joint line of said fingerprint from positional information of said candidate valleys detected by said valley candidate calculator and from said confidence value calculated by said strip confidence calculator.

2. An apparatus for extracting fingerprint features recited in claim 1, wherein said valley candidate calculator comprises:

a histogram differentiator for differentiating said histograms in said y direction;

a zero-cross detector for detecting y coordinates of each of said histograms where polarity of said each of said histograms changes; and a valley position calculator for discriminating whether said each of said y coordinates where polarity of said each of said histograms changes correspond to a candidate valley to be detected.

3. An apparatus for extracting fingerprint features recited in claim 1, wherein said valley information integrator comprises:

a hough transformer for calculating a hough image by performing a hough transform of coordinates of a certain of said candidate valleys delivered from said valley candidate calculator;

a hough peak detector for detecting peak coordinates of said hough image where a pixel value of said hough image becomes highest; and an inverse hough transformer for calculating said joint line by performing an inverse hough transform of said peak coordinates.

4. An apparatus for extracting fingerprint features comprising:

a vertical strip divider for dividing digitized data of a fingerprint into data of a plurality of strips with straight lines parallel to a y direction;

a projection calculator for obtaining histograms, each of said histograms calculated by accumulating pixel values of each of said plurality of strips in an x direction perpendicular to said y direction;

a valley candidate calculator for detecting candidate valleys from said histograms, one of said histograms having a locally minimum value at each of said candidate valleys;

a valley confidence calculator for calculating valley confidence for each of said candidate valleys;

a strip confidence calculator for calculating strip confidence for each of said plurality of strips; and a valley information integrator for calculating a position of a joint line of said fingerprint and confidence of said joint line from positional information of said candidate valleys detected by said valley candidate calculator, said valley confidence calculated by said valley confidence calculator and said strip confidence calculated by said strip confidence calculator.

5. An apparatus for extracting fingerprint features recited in claim 4, wherein said valley candidate calculator comprises:

a histogram differentiator for differentiating said histograms in said y direction;

a zero-cross detector for detecting y coordinates of each of said histograms where polarity of said each of said histograms changes; and a valley position calculator for discriminating whether said each of said y coordinates where polarity of said each of said histograms changes correspond to a candidate valley to be detected.

6. An apparatus for extracting fingerprint features recited in claim 4, wherein said valley information integrator comprises:

a strip selector for selecting a certain of said plurality of strips according to said strip confidence delivered from said strip confidence calculator;

a hough transformer for calculating a hough image by performing a hough transform of coordinates of a certain of said candidate valleys delivered from said valley candidate calculator and existing on said certain of said plurality of said strips selected by said strip selector;

a hough peak detector for detecting peak coordinates of said hough image where a pixel value of said hough image becomes highest; and an inverse hough transformer for calculating said joint line by performing an inverse hough transform of said peak coordinates.

7. An apparatus for extracting fingerprint features recited in claim 6, wherein said hough transformer increases pixel values of coordinates corresponding to each of said certain of candidate valleys with a value proportional to valley confidence of said each of said certain of candidate valleys calculated by said valley confidence calculator instead of increasing with such a constant value as used in a ordinary hough transform.

8. An apparatus for extracting fingerprint features recited in claim 6, wherein said valley information integrator further comprises:

a neighboring valley selector for selecting candidate valleys neighboring to said joint line;

an approximate line calculator for calculating an approximate line by a least-square approximation from said candidate valleys neighboring to said joint line selected by said neighboring valley selector; and a joint line confidence calculator for calculating confidence of said approximate line from valley confidence of said candidate valleys neighboring to said joint line selected by said neighboring valley selector.

* * * * *